(12) United States Patent
Ahn et al.

(10) Patent No.: US 11,026,544 B2
(45) Date of Patent: Jun. 8, 2021

(54) VACUUM BLENDER

(71) Applicants: Joung Geun Ahn, Ansan-si Gyeonggi-do (KR); Byung Hyun An, Ansan-si Gyeonggi-do (KR); Kyung Soon Kim, Ansan-si Gyeonggi-do (KR); Se Hee An, Ansan-si Gyeonggi-do (KR)

(72) Inventors: Joung Geun Ahn, Ansan-si Gyeonggi-do (KR); Byung Hyun An, Ansan-si Gyeonggi-do (KR); Kyung Soon Kim, Ansan-si Gyeonggi-do (KR); Se Hee An, Ansan-si Gyeonggi-do (KR)

( * ) Notice: Subject to any disclaimer, the term of this patent is extended or adjusted under 35 U.S.C. 154(b) by 6 days.

(21) Appl. No.: 16/633,042

(22) PCT Filed: Jul. 3, 2018

(86) PCT No.: PCT/KR2018/007524
§ 371 (c)(1),
(2) Date: Jan. 22, 2020

(87) PCT Pub. No.: WO2019/022398
PCT Pub. Date: Jan. 31, 2019

(65) Prior Publication Data
US 2020/0205614 A1    Jul. 2, 2020

(30) Foreign Application Priority Data

Jul. 24, 2017   (KR) .................. 10-2017-0093386
Apr. 6, 2018    (KR) .................. 10-2018-0040144

(51) Int. Cl.
*A47J 43/046*    (2006.01)
*A47J 43/07*     (2006.01)
*B02C 18/16*     (2006.01)

(52) U.S. Cl.
CPC ......... *A47J 43/0716* (2013.01); *A47J 43/046* (2013.01); *B02C 18/16* (2013.01)

(58) Field of Classification Search
CPC ...... B02C 18/18; B02C 23/26; A47J 43/0716; A47J 43/046
(Continued)

(56) References Cited

FOREIGN PATENT DOCUMENTS

| CN | 106377181 A | * | 2/2017 | ............ A47J 43/046 |
| CN | 106377181 A | | 2/2017 | |

(Continued)

*Primary Examiner* — Shelley M Self
*Assistant Examiner* — Kevin E O'Brien
(74) *Attorney, Agent, or Firm* — Novick, Kim & Lee, PLLC; Jae Youn Kim

(57) ABSTRACT

A vacuum blender can crush foods, such as vegetables and fruits, in a vacuum state and preserve the foods in the vacuum state. Noise can be reduced because foods are put into an accommodation member and the foods accommodated in the accommodation member are blended in a state in which the accommodation member is covered by a cover member. Further, because a first chamber part is formed in the interior of the accommodation member and a first check valve is mounted and a second chamber part that is an empty space is formed between the accommodation member and the cover member, the first chamber part, in which the foods are accommodated, is vacuumed while the first check valve is automatically opened if the second chamber part is vacuumed without using a separate hose connected to the first chamber part.

17 Claims, 10 Drawing Sheets

(58) Field of Classification Search
USPC .............................. 241/92, 282.2, 282.1, 60
See application file for complete search history.

(56) References Cited

FOREIGN PATENT DOCUMENTS

| | | | | |
|---|---|---|---|---|
| CN | 107411589 A | * | 12/2017 | .......... A47J 43/0716 |
| JP | 3021906 B2 | | 3/2000 | |
| JP | 2015-119868 A | | 7/2015 | |
| KR | 10-1441093 B1 | | 9/2014 | |
| KR | 10-2015-0145163 A | | 12/2015 | |

* cited by examiner

VACUUM BLENDER

BACKGROUND OF THE INVENTION

1. Field of the Invention

The present invention relates to a vacuum blender, and more particularly, to a vacuum blender which can blend foods, such as vegetables and fruits, in a vacuum state and preserve the foods in the vacuum state.

2. Description of the Prior Art

A mixer (blender) is one of electric appliances that are used in homes most widely today, and blends foods such as fruits, vegetables, and grains finely by using mixer blades that are rotatably installed at a lower portion of a storage container to allow a user to take the foods.

Generally, foods that are blending targets are introduced into a storage container of a mixer, the cover of the mixer is closed, and mixer blades are rotated by a motor that is rotated at a high speed, and in this process, many foams are generated while air in the storage container and the blended food grains are mixed at a high speed.

For example, if fruits such as bananas or tomatoes are put into a mixer to be blended, a large number of foams are generated at upper portions of the fruit juice.

This means that the taste and texture of food has been lowered and the fiber textures of the fruits have been already oxidized and considerably destructed in the blending process when the fruit juice is drunken.

Further, if the foods are preserved in a state in which they are exposed to air when the foods are to be preserved without immediately taken after the blending, the oxidation process proceeds more rapidly so that the destruction of the fiber textures and the nutrients is accelerated, the colors of the foods are changed, deteriorating the freshness of the foods, and the layers of the air and the foods are separated.

In this way, the foods blended by the mixer are not taken immediately, it is difficult to preserve the foods for a long time.

In order to solve the above-described problems, a vacuum mixer designed to blend foods in a vacuum state has been developed.

Meanwhile, because the mixer blends the foods while rotating a cutter blade with a motor, the motor generates noise and blending noise.

Further, because the vacuum mixer further requires a vacuum pump for vacuuming, it generates severer noise than a general mixer.

SUMMARY OF THE INVENTION

The present invention has been made in an effort to solve the above-described problems, and provides a vacuum blender that can blend foods in a vacuum state when the foods is blended by a blender (mixer), can easily preserve the foods in a vacuum state after the foods are blended, and can minimize noise in a blending step.

According to an embodiment, there is provided a vacuum blender including a driving body, in which a motor is mounted on the interior thereof, an accommodation member detachably coupled to an upper portion of the driving body and having a first chamber part configured to accommodate foods in the interior thereof, a cutter blade disposed in the first chamber part and connected to the motor to blend the foods accommodated in the first chamber part, a cover member detachably coupled to the driving body while covering the outside of the accommodation member, a second chamber part formed along a circumference of the accommodation part between the outside of the accommodation member and the interior of the cover member, a first check valve mounted on the accommodation member and configured to selectively communicate the first chamber part and the interior of the cover member, a vacuum pump mounted on the driving body and communicated with the first chamber part, a suction hole formed at an upper portion of the driving body between the accommodation member and the cover member and configured to communicate the second chamber part and the vacuum pump, and a communication valve mounted on the driving body and configured to open and close a passage between the second chamber part and the vacuum pump, wherein the state of the first check valve is maintained by closing the communication of the first chamber part and the second chamber part in a state in which an external force is not applied, and wherein when the vacuum pump is operated, the air in the interior of the second chamber part is discharged to the outside through the suction hole and the vacuum pump, wherein the first check valve is opened by the vacuum pressure such that the second chamber part and the first chamber part are vacuumed while the air in the interior of the first chamber part is discharged through the suction hole and the vacuum pump via the first check valve and the second chamber part, wherein if the second chamber part and the first chamber part are vacuumed to a preset state, the communication valve closes the passage between the vacuum pump and the second chamber part, wherein if exterior is introduced into the second chamber part by opening the communication valve that closes the passage between the second chamber part and the vacuum pump, the vacuum state of the second chamber part is released, and wherein as the exterior air is introduced into the second chamber part, the first check valve maintains the vacuum state of the first chamber part by closing the communication of the first chamber part and the second chamber part by the vacuum pressure of the first chamber part.

Further, in order to achieve the object, the vacuum blender of the present invention may include a driving body, in which a motor is mounted on the interior thereof, an accommodation member detachably coupled to an upper portion of the driving body and having a first chamber part configured to accommodate foods in the interior thereof, a cutter blade disposed in the first chamber part and connected to the motor to blend the foods accommodated in the first chamber part, a cover member detachably coupled to the driving body while covering the outside of the accommodation member, and a first check valve mounted on the accommodation member and configured to be opened only when air is discharged from the first chamber part to the outside by selectively communicating the first chamber part and the interior of the cover member, a second chamber part formed along a circumference of the accommodation part between the outside of the accommodation member and the interior of the cover member, and a second check valve mounted on the cover member and configured to be opened only when air is discharged from the second chamber part to the outside by selectively communicating the outside of the second chamber part, a vacuum pump may be operated in a state in which a suction hose of the vacuum pump disposed on the outside is coupled to the second check valve, the air in the interior of the second chamber part may be discharged to the outside through the second check valve and the vacuum pump, the first check valve is opened by a vacuum pressure, and the air in the interior of the first chamber part may be discharged to the outside through the vacuum pump via the first check valve, the second chamber part, and the second check valve, and as the exterior air is introduced into the second chamber part, the first check valve is closed and the first chamber part may maintain the vacuum state while the vacuum state is not released, and the vacuum state of the interior of the first chamber part may be released through the first check valve.

According to an embodiment, the vacuum blender may further include an impact absorbing member configured to reduce vibration of the accommodation member as one end thereof contacts an outer peripheral surface of the accommodation member and an opposite end thereof contacts an inner peripheral surface of the cover member.

According to an embodiment, the impact absorbing member may be coupled to an inner peripheral surface of the cover member, and when the second chamber part is vacuumed, the impact absorbing member may be adhered to an outer peripheral surface of the accommodation member while the cover member is deflected toward the accommodation member by a vacuum pressure.

According to an embodiment, a vacuum channel communicated with the second chamber part may be formed on a side wall of the driving body, and when the vacuum pump is operated, the vacuum channel may be vacuumed.

According to an embodiment, the vacuum channel may be formed along a circumference of the motor, and a lower end of the vacuum channel may extend to a lower portion of the motor or extend downwards further than the lower portion of the motor.

According to an embodiment, the vacuum blender may further include a pressure sensor mounted on the driving body to measure the pressure of the air flowing through the suction hole, and if the pressure value measured by the pressure sensor is a preset value or more, the communication valve may close the passage between the vacuum pump and the second chamber part.

According to an embodiment, the cover member may be adhered and coupled to the driving body by a vacuum pressure when the second chamber part is vacuumed.

According to an embodiment, there is provided a vacuum blender including a driving body, in which a motor is mounted on the interior thereof, an accommodation member detachably coupled to an upper portion of the driving body and having a first chamber part configured to accommodate raw foods in the interior thereof, a cutter blade disposed in the first chamber part and connected to the motor to blend the raw foods accommodated in the first chamber part, a cover member detachably coupled to an upper portion of the driving body while covering the entire outside of the accommodation member and defining a second chamber part along an upper portion and a circumference of a side surface of the accommodation member between the cover member and the outside of the accommodation member, a first check valve mounted in a first discharge hole formed in the accommodation member and configured to selectively communicate the first chamber part and the second chamber part by opening and closing the first discharge hole, a second check valve mounted in a second discharge hole formed in the cover member and configured to selectively communicate the second chamber part and the outside by opening and closing the second discharge hole, an impact absorbing member, one end of which contacts an outer peripheral surface of the accommodation member and an opposite end of which contacts an inner peripheral surface of the cover member such that vibration of the accommodation member is reduced, wherein the accommodation member may be disposed inside the second chamber part while being spaced apart from the cover member, and the first check valve may open the first discharge hole by an external force to communicate the first chamber part and the second chamber part. wherein the second check valve interrupts the communication of the second chamber part and the outside by closing the second discharge hole in a free state, and communicates the second chamber part and the outside by opening the second discharge hole by an external force, wherein the first chamber part is vacuumed as the first check valve opens the first discharge hole by a vacuum pressure while the second chamber part is vacuumed by an operation of the vacuum pump communicated with the second chamber part, and wherein when the second discharge hole is opened by the second check valve in a state in which the first chamber part and the second chamber part are vacuumed, the vacuum state of the second chamber part is released as exterior air is introduced, and the first check valve closes the first discharge hole by a vacuum pressure of the first chamber part such that the first chamber part maintains a state in which the first chamber part is vacuumed independently from the second chamber part, and wherein the impact absorbing member may be coupled to the inner peripheral surface of the cover member, the impact absorbing member is spaced apart from the outer peripheral surface of the accommodation member in a state in which the second chamber part is not vacuumed, and when the second chamber part is vacuumed, the impact absorbing member is attached to the outer peripheral surface of the accommodation member while the cover member moves toward the accommodation member by the vacuum pressure.

According to an embodiment, the vacuum blender may further include a first vacuum pump mounted on the driving body, wherein the first vacuum pump is communicated with the second chamber part through a suction hole formed in the driving body, the first discharge hole and the suction hole may be spaced apart from each other by the second chamber part, and when the first vacuum pump is operated, the air in the second chamber part may be discharged to the outside through the first vacuum pump.

According to an embodiment, the vacuum blender may further include a second vacuum pump mounted on the outside of the driving body, the second vacuum pump may be coupled to an upper portion of the second check valve by a suction hose, the first discharge hole and the second discharge hole may be spaced apart from each other by the second chamber part, and when the second vacuum pump is operated, the second check valve may open the second discharge hole and the air in the second chamber part may be discharged to the outside through the second discharge hole and the second vacuum pump.

According to an embodiment, the first check valve and the second check valve may be spaced apart from each other, and the second chamber part may be formed between the first check valve and the second check valve.

According to an embodiment, a first elastic closing member may be disposed between the accommodation member and the driving body, a second elastic closing member may be disposed between a lower end of the cover member and an upper surface of the driving body, the first elastic closing member and the second elastic closing member may interrupt the communication of the second chamber part and the outside, and may be elastically deformed when an external force is applied to absorb a relative movement of the cover member and the driving body.

According to an embodiment, the impact absorbing member may include a material that becomes elastic while air passes through the interior of the impact absorbing member.

The first check valve may interrupt the communication of the first chamber part and the second chamber part by closing the first discharge hole in a free state, and communicates the first chamber part and the second chamber part by opening the first discharge hole by an external force.

The above-described vacuum blender according to the present invention has the following effects.

According to the present invention, because foods such as raw foods are blended in a vacuum state, the blended raw foods can be prevented from contacting air, changing the colors of the raw foods or destructing the nutrients.

The first chamber part, in which the blended raw foods are present, can be maintained in the vacuum state independently from the second chamber part that is present outside while the first chamber part and the second chamber part are vacuumed together by the first check valve mounted on the accommodation member, in which the foods such as raw foods are accommodated.

Further, according to the present invention, noise generated during the blending operation can be interrupted by the cover member and the second chamber part in the vacuum state, and the noise delivered to the outside can be reduced.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

First Embodiment

Figure 1:
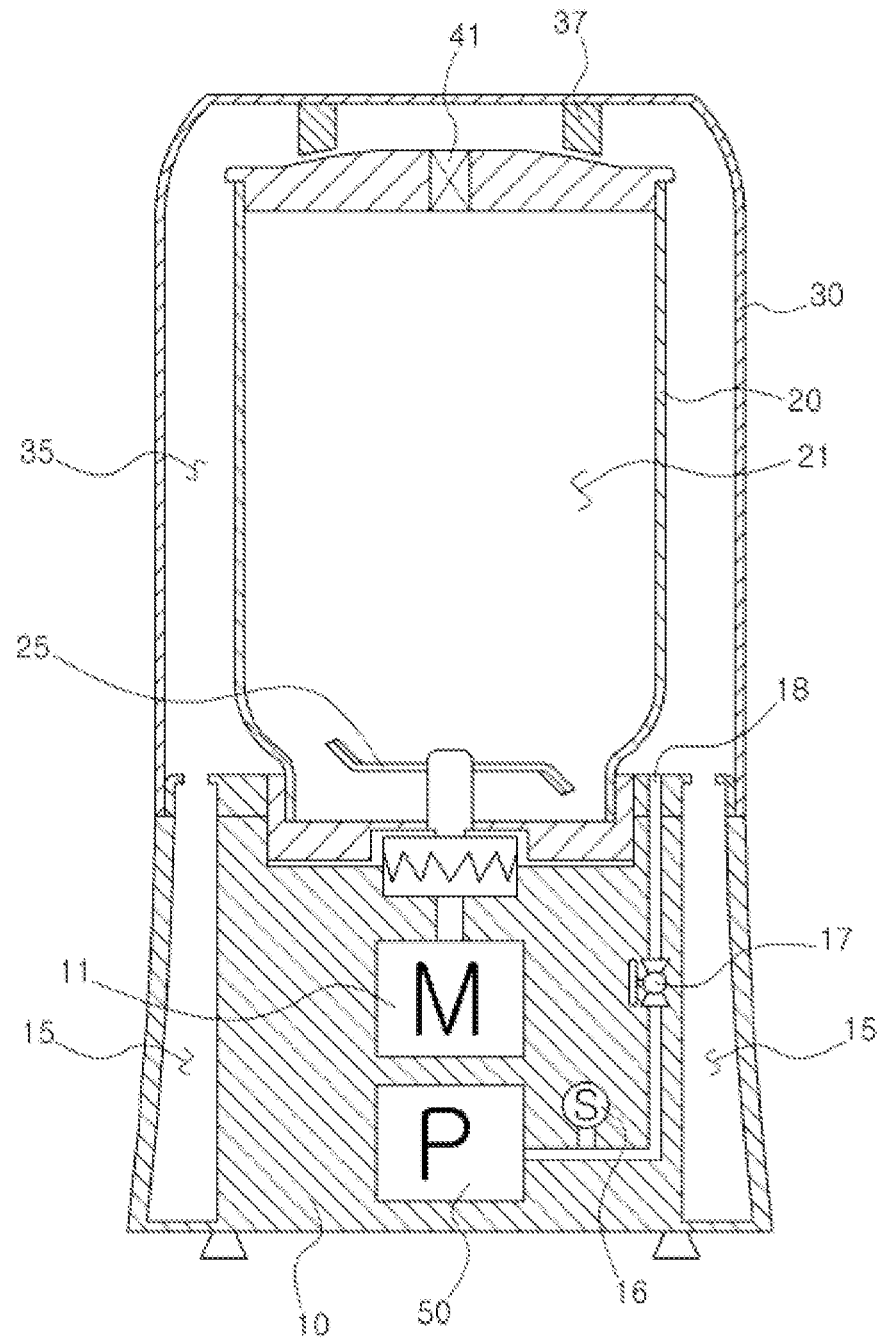
FIG. 1 is a view illustrating a side structure of a vacuum blender according to a first embodiment of the present invention.
Figure 2:
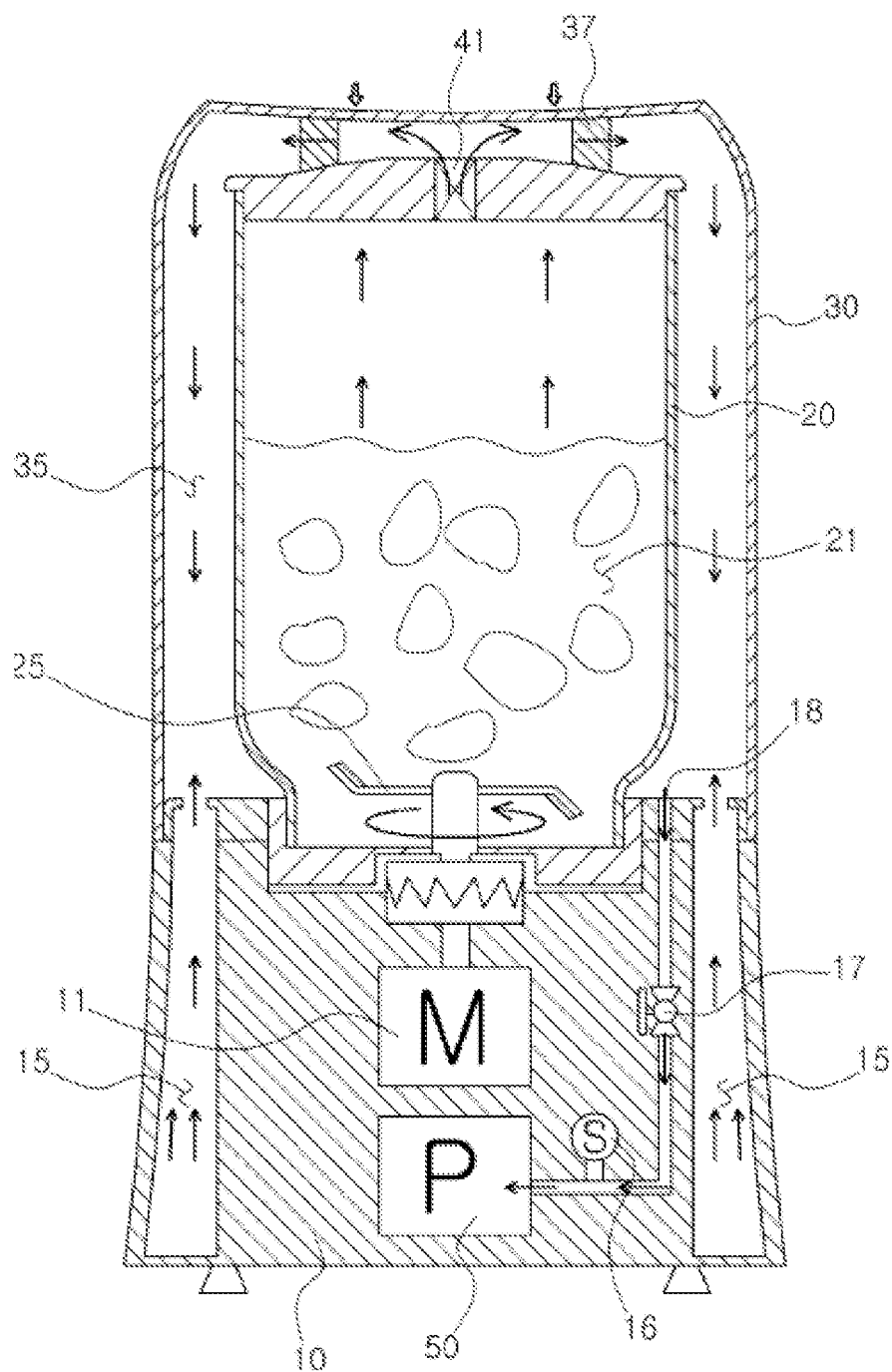
FIG. 2 is a view illustrating an operational process of the vacuum blender according to the first embodiment of the present invention.

FIG. 1 is a view illustrating a side structure of a vacuum blender according to a first embodiment of the present invention. FIG. 2 is a view illustrating an operational process of the vacuum blender according to the first embodiment of the present invention.

A vacuum blender of the present invention includes a driving body 10, an accommodation member 20, a cutter blade 25, a cover member 30, a first check valve 41, and a vacuum pump 50.

A motor 11 is mounted on the interior of the driving body 10.

A first chamber part 21 that accommodates foods in the interior thereof is formed in the accommodation member 20, and the accommodation member 20 is detachably coupled to an upper portion of the driving member 10.

The cutter blade 25 is disposed in the first chamber part 21, and is connected to the motor 11 to be rotated to blend the foods accommodated in the first chamber part 21.

The cover member 30 has various shapes, such as a cup shape, by which air may be interrupted, and is detachably coupled to the driving body 10 while covering the outside of the accommodation member 20.

The first check valve 41 is mounted on the accommodation member 20, and is opened only when air is discharged from the first chamber part 21 to the outside and normally maintains a closed state.

In a state in which the cover member 30 covers the accommodation member 20, the first check valve 41 is opened to communicate the first chamber part 21 and the interior of the cover member 30.

The first check valve 41 may be mounted at various locations of the accommodation member 20, but preferably is mounted on an upper portion of the accommodation member 20.

The structure of the first check valve 41 may be sufficient by using a conventionally known structure, and a detailed description thereof will be omitted.

A second chamber part 35 is formed between the outside of the accommodation member 20 and the interior of the cover member 30.

The second chamber part 35 is formed along a circumference of the accommodation member 20 as a whole.

The vacuum pump 50 is mounted on the driving body 10.

The vacuum pump 50 is communicated with the second chamber part 35.

To achieve this, a suction hole 18 that connects the second chamber part 35 and the vacuum pump 50 is formed in the driving body 10, and the suction hole 18 is formed at an upper portion of the driving body 10 between the accommodation member 20 and the cover member 30. Accordingly, the suction hole 18 is communicated with the second chamber part 35, and when the vacuum pump 50 is operated, the air in the interiors of the second chamber part 35 and the first chamber part 21 is discharged to the outside through the suction hole 18 such that the interiors of the second chamber part 35 and the first chamber part 21 are vacuumed.

In more detail, when the vacuum pump 50 is operated, the air in the interior of the second chamber part 35 is discharged to the outside through the vacuum pump 50 after passing through the suction hole 18.

Further, as the air in the interior of the second chamber part 35 is discharged to the outside, the first check valve 41 is opened by the vacuum pressure of the second chamber part 35.

If the first check valve 41 is opened, the air in the interior of the first chamber part 21 is discharged to the second chamber part 35 through the first check valve 41, and the air in turn is discharged to the outside through the suction hole 18 and the vacuum pump 50.

Accordingly, as the vacuum pump 50 is operated, the second chamber part 35 and the first chamber part 21 are vacuumed, and the cover member 30 is lowered by the vacuum pressure when the second chamber part 35 is vacuumed to be adhered and coupled to the driving body 10.

Because the foods are blended in a vacuum state when the foods accommodated in the first chamber part 21 is blended in a vacuum state by vacuuming the first chamber part 21, browning and destruction of nutrients caused when the foods contact air can be prevented.

Further, by vacuuming the second chamber part 35 formed outside the first chamber part 21, noise generated when the foods accommodated in the first chamber part 21 and noise of the cutter blade 25 can be interrupted not only by the cover member 30 but also by the vacuumed second chamber part 35 such that the noise can be restrained from being emitted more effectively.

Then, when the foods accommodated in the first chamber part 35 is blended, it is an option whether to vacuum the second chamber part 35.

That is, because the foods accommodated in the first chamber part 21 may be blended in a state in which the vacuum state of the second chamber part 35 is released and in this case, the cover member 30 covers the accommodation member 20, the noise generated when the foods are blended and the noise of the cutter blade 25 can be reduced.

Further, a pressure sensor 16 and a communication valve 17 are mounted on the driving body 10.

The pressure sensor 16 is mounted on the driving body 10, and measures the pressure of the air flowing to the vacuum pump 50 through the suction hole 18.

The communication valve 17 opens and closes a passage between the vacuum pump 50 and the second chamber part 35.

The communication valve 17 includes a solenoid valve, and determines that a vacuum state is formed if the pressure value measured by the pressure sensor 16 is a preset value or more, and closes the passage between the vacuum pump 50 and the second chamber part 35, or the passage may be opened if necessary.

Meanwhile, a vacuum channel 15 communicated with the second chamber part 15 is further formed on a side wall of the driving body 10.

The entire upper surface of the vacuum channel 15 may be communicated with the second chamber part 35, and a portion of the upper surface of the vacuum channel 15 may be communicated with the second chamber part 35.

The vacuum channel 15 is formed on the side wall of the driving body 10 to surround a circumference of the motor 11.

Accordingly, when the vacuum pump 50 is operated, the air in the vacuum channel 15 is vacuumed together with the second chamber part 35 while being discharged to the outside.

In this way, as the vacuum channel 15 that surrounds the circumference of the motor 11 is vacuumed, the noise generated when the motor 11 is operated can be restrained from being delivered to the outside.

It is preferable that a lower end of the vacuum channel 15 extends to a lower portion of the motor 11 or extends downwards further than the lower portion of the motor 11 to effectively interrupt the noise generated by the motor 11 by the vacuum channel 15.

Further, the present invention may further include an impact absorbing member 37 that reduces vibration of the accommodation member 20 as one end thereof contacts an outer peripheral surface of the accommodation member 20 and an opposite end thereof contacts an inner peripheral surface of the cover member 30.

The impact absorbing member 37 includes elastic rubber, a cylinder, sponge, and a spring.

When the foods are blended by the impact absorbing member 37, the accommodation member 20 can be restrained from vibrating such that noise can be minimized.

In the drawings of the embodiment, the impact absorbing member 37 contacts the upper surface of the accommodation member 20 and the inner peripheral surface of an upper portion of the cover member 30 to be adhered thereto, and a plurality of impact absorbing members 37 may be disposed to be spaced apart from each other such that air may flow between the impact absorbing members 37.

Further, the impact absorbing member 37 is coupled to an inner peripheral surface of the cover member 30 and is slightly spaced apart from the accommodation member 20 such that the impact absorbing member 37 is adhered to an outer peripheral surface of the accommodation member 20 while the cover member 30 is deflected toward the accommodation member 20 by the vacuum pressure when the second chamber part 35 is vacuumed, and thus the shaking of the accommodation member 20 and the cover member 30 can be reduced.

Hereinafter, an operation process of the present invention including the above-described configuration will be discussed.

The foods are introduced into the first chamber part 21 formed in the interior of the accommodation member 20, and the accommodation member 20 is coupled to the driving body 10.

Then, a lower portion of the cutter blade 25 and the motor 11 are coupled to each other.

Thereafter, the cover member 30 is covered to be coupled to the driving body 10 such that the cover member 30 covers the outside of the accommodation member 20.

Then, the cover member 30 may be coupled to an upper surface of the driving body 10 without any specific mounting directionality.

If electric power is applied in this state, the foods that are present in the first chamber part 21 are blended while the cutter blade 25 is rotated by the motor 11.

Further, the vacuum pump 50 is operated such that the air that is present in the interiors of the second chamber part 35 and the first chamber part 21 is discharged to the outside.

In more detail, the air that is present in the interior of the first chamber part 21 flows to the second chamber part 35 as the first check valve 41 is opened, and then is discharged to the outside through the suction hole 18 and the vacuum pump 50.

Further, the vacuum channel 15 formed on a side wall of the driving body 10 along the circumference of the motor 11 is also vacuumed as the second chamber part 35 is vacuumed.

If the first chamber part 21 is vacuumed in this way, the contact of the foods with the air is interrupted when the foods are blended, and thus the change of the color of the foods, the destruction of the nutrients, or the contamination of the foods can be prevented.

Further, as the second chamber part 35 formed at the circumference of the accommodation member 20 is vacuumed is interrupted, noise generated when the cutter blade 25 is rotated can be interrupted.

In addition, as the vacuum channel 15 formed along the circumference of the motor 11 is vacuumed, the noise generated when the motor 11 and the vacuum pump 50 are generated are vacuumed can be prevented from being emitted.

Further, as the second chamber part 35 is vacuumed, the cover member 30 is further adhered and coupled to the driving body 10, and the impact absorbing member 37 is attached to the outer peripheral surface of the accommodation member 20 to further prevent the accommodation member 20 and the cover member 30 from being shaken.

Meanwhile, as the first chamber part 21 and the second chamber part 35 are vacuumed, the pressure sensor 16 measures the pressure of the air that flows to the vacuum pump 50 through the suction hole 18, and then, if the pressure value measured by the pressure sensor 16 becomes a preset value or more, it is determined that the first chamber part 21 and the second chamber part 35 are vacuumed, and the communication valve 17 closes the passage between the vacuum pump 50 and the second chamber part 35.

Accordingly, the first chamber part 21, the second chamber part 35, and the vacuum channel 15 maintain the vacuum states.

After the foods are completely blended, the vacuum states of the second chamber part 35 and the vacuum channel 15 are released by opening the communication valve 17 such that the exterior air flows into the interiors of the second chamber part 35 and the vacuum channel 15.

Then, as the exterior air is introduced into the second chamber part 35, the first check valve 41 is closed, and the first chamber part 21 maintains the vacuum state while the vacuum state of the first chamber part 21 is not released.

After the cover member 30 is separated from the driving body 10, the accommodation member 20, the interior of which is vacuumed, may be separated from the driving body 10 and be separately preserved in a refrigerator or the like.

That is, according to the present invention, the foods can be introduced into a refrigerator or the like alone while the interior thereof is vacuumed and can be preserved in a vacuum/refrigeration state by separating only the accommodation member 20, in which the blended foods are accommodated.

When the foods are to be taken, fresh foods that are present in the interior of the first chamber part 21 can be taken after the vacuum state of the interior of the first chamber part 21 is released through the first check valve 41.

In this way, according to the present invention, the foods can be blended with vacuum, and a more excellent performance and a better product can be obtained by reducing the noise generated when a mixer, that is, a blender is operated.

Second Embodiment

Figure 3:
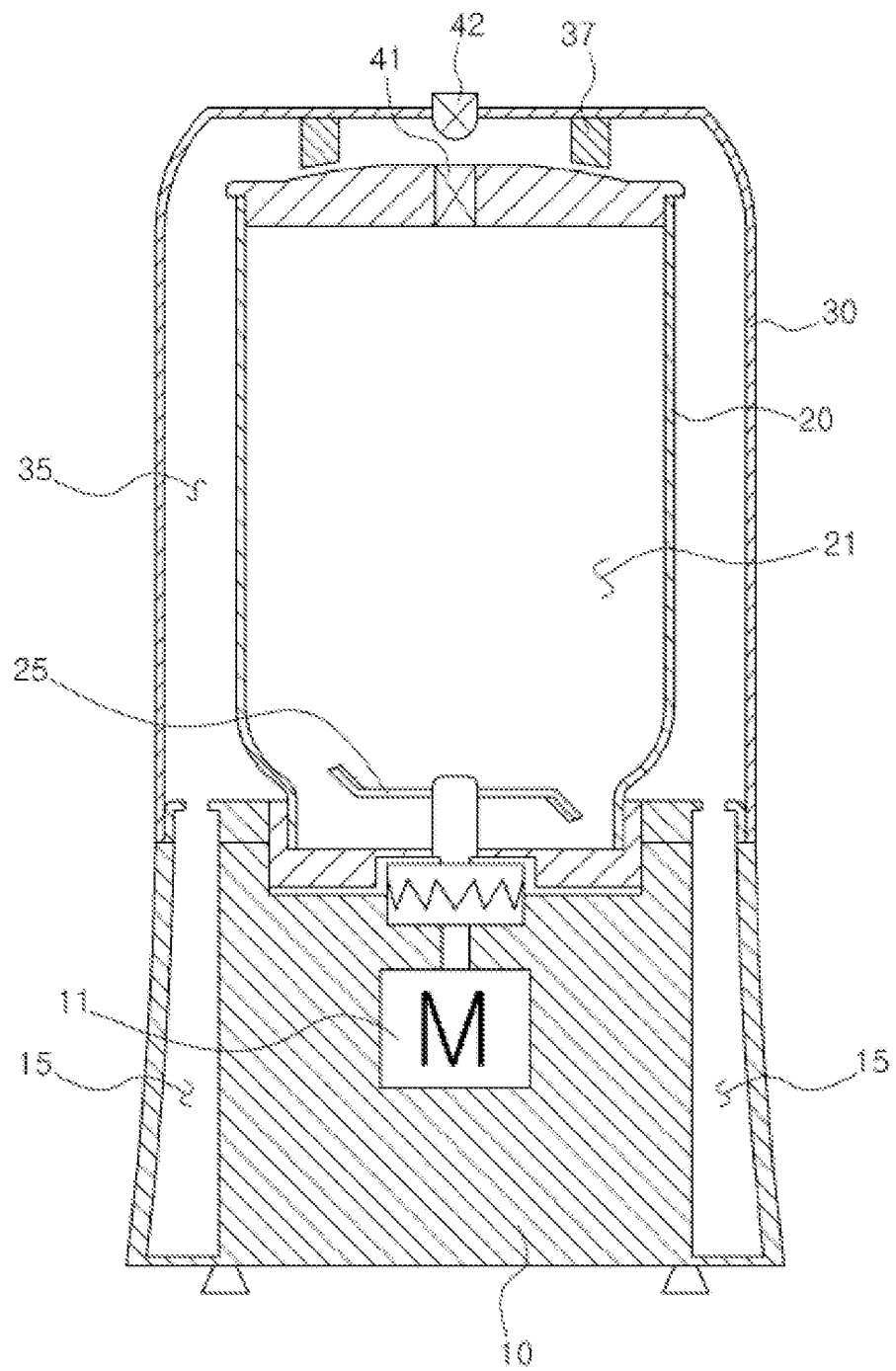
FIG. 3 is a view illustrating a side structure of a vacuum blender according to a second embodiment of the present invention.
Figure 4:
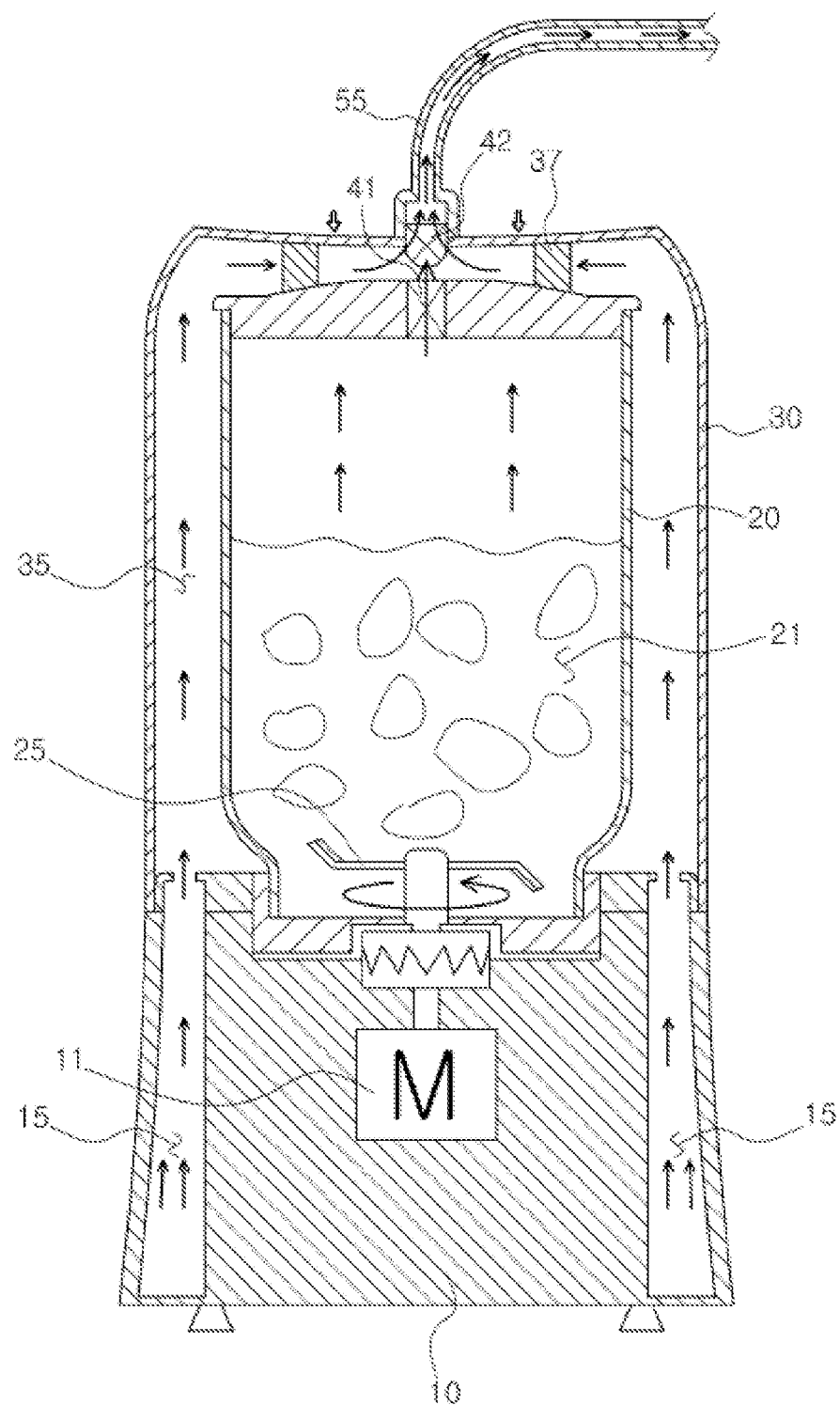
FIG. 4 is a view illustrating an operational process of the vacuum blender according to the second embodiment of the present invention.

FIG. 3 is a view illustrating a side structure of a vacuum blender according to a second embodiment of the present invention. FIG. 4 is a view illustrating an operational process of the vacuum blender according to the second embodiment of the present invention.

The second embodiment is different from the first embodiment in the second check valve 42, the vacuum pump, and the like, and the second check valve 42 and the vacuum pump will be mainly described.

Although the vacuum pump 50 is mounted on the driving body 10 in the first embodiment, the vacuum pump is present outside the driving body 10 in the second embodiment.

The vacuum pump may be a separate device, and an existing vacuum pump such as a vacuum packing machine may be used.

That is, the second embodiment is different from the first embodiment in that the vacuum pump is not mounted on the vacuum blender and a vacuum pump that is present on the outside is used.

The second check valve 42 is mounted on the cover member 30, and selectively communicates the second chamber part 35 with the outside to be opened only when the air is discharged from the second chamber part 35 to the outside.

The detailed structure of the second check valve 42 may be a conventionally known check valve structure, and a detailed description thereof will be omitted.

The second check valve 42 may be mounted at any location of the cover member 30, but in the embodiment, is mounted on an upper portion of the cover member 30.

The vacuum blender of the second embodiment including the above configuration is operated as illustrated in FIG. 4.

As in the first embodiment, after the foods are introduced into the first chamber part 21, the first chamber part 21 and the cover member 30 are coupled to each other.

Further, the suction hose 55 of the vacuum pump disposed on the outside is adhered to an upper portion of the second check valve 42.

In this state, if the motor 11 and the vacuum pump are operated, the air in the interior of the second chamber part 35 discharged to the outside through the vacuum pump via the second check valve 42 and the suction hose 55.

Further, the first check valve 41 is opened by the vacuum pressure of the second chamber part 35 and the air in the interior of the first chamber part 21 is discharged to the outside through the vacuum pump via the first check valve 41, the second chamber part 35, the second check valve 42, and the suction hose 55.

Further, the air of the vacuum channel 15 formed on the side wall of the body is discharged to the outside through the vacuum pump that is present on the outside after passing through the second chamber part 35, the second check valve 42, and the suction hole 55.

Accordingly, as in the first embodiment, the outskirt of the first chamber part 21 and the outskirt of the motor 11 are vacuumed, and thus the noise can be reduced more effectively during the operation thereof.

In the second embodiment, because the user compulsorily opens the second check valve 42, the vacuum state of the second chamber part 35 that is present in the interior of the cover member 30 can be released.

The other items are the same as or similar to the first embodiment, and a detailed description thereof will be omitted.

Third Embodiment

Figure 5:
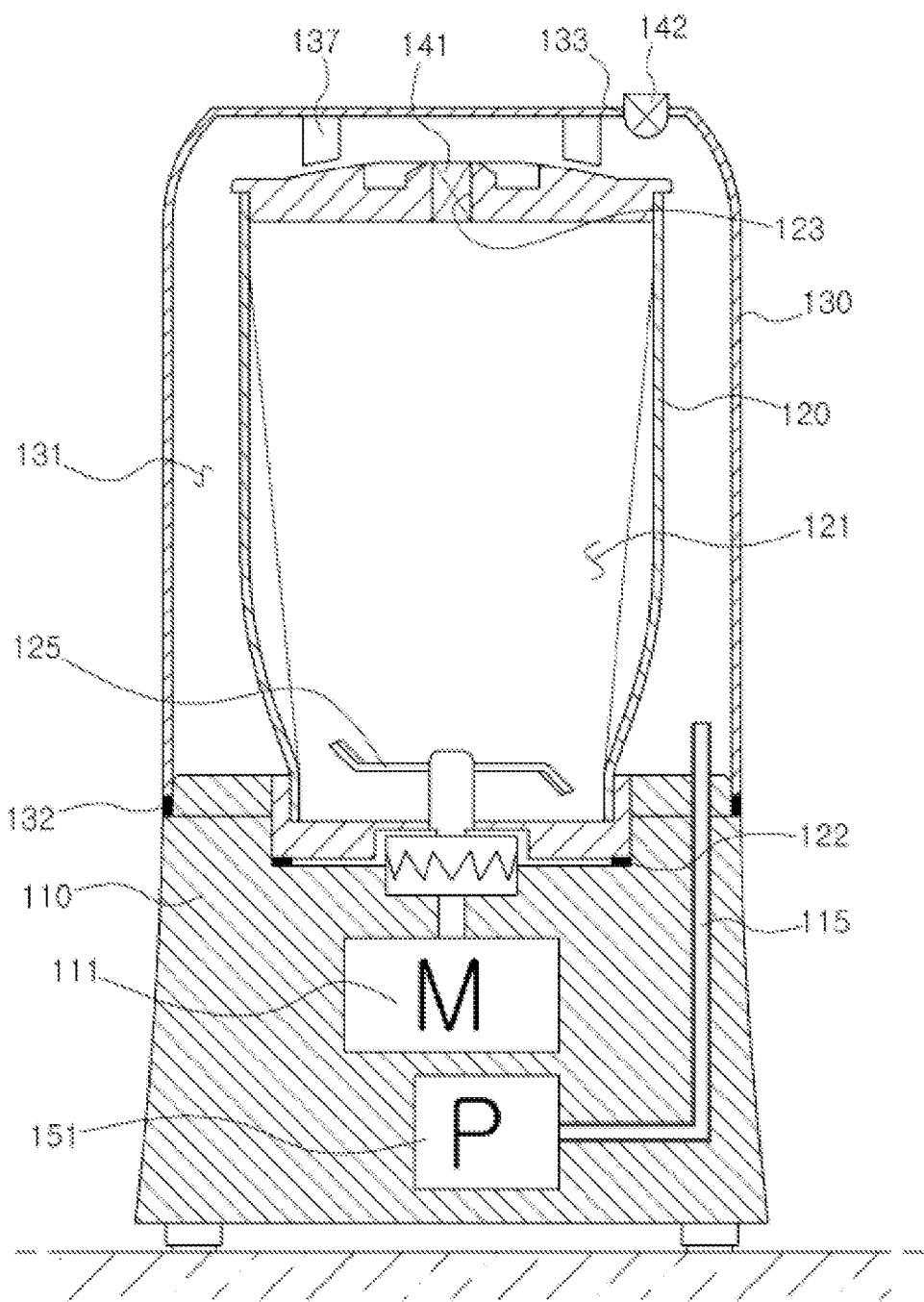
FIG. 5 is a view illustrating a side structure of a vacuum blender according to a third embodiment of the present invention.
Figure 6:
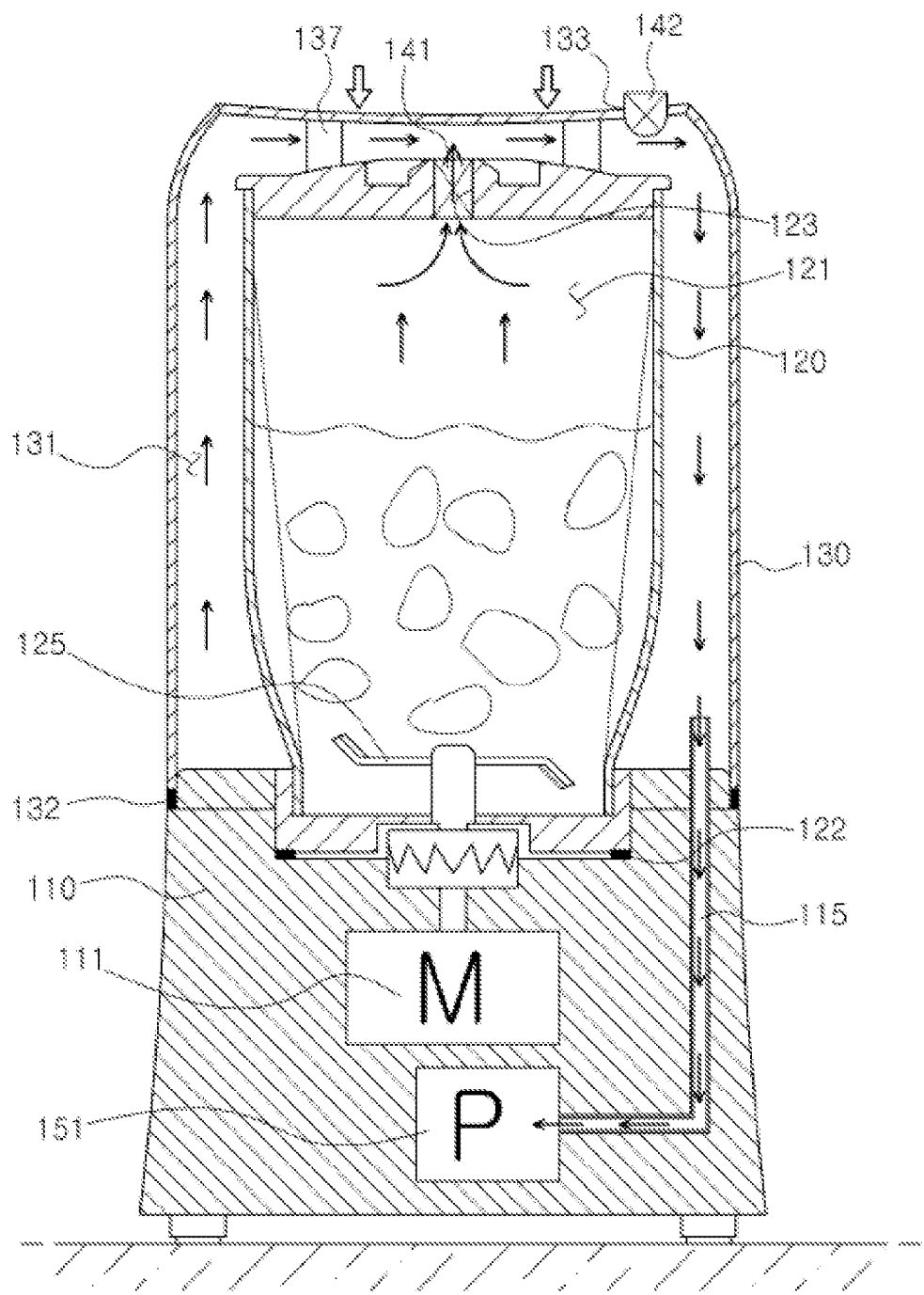
FIG. 6 is a view illustrating a side structure of a vacuum blender in a state in which the interior of the vacuum blender is vacuumed according to a third embodiment of the present invention.
Figure 7:
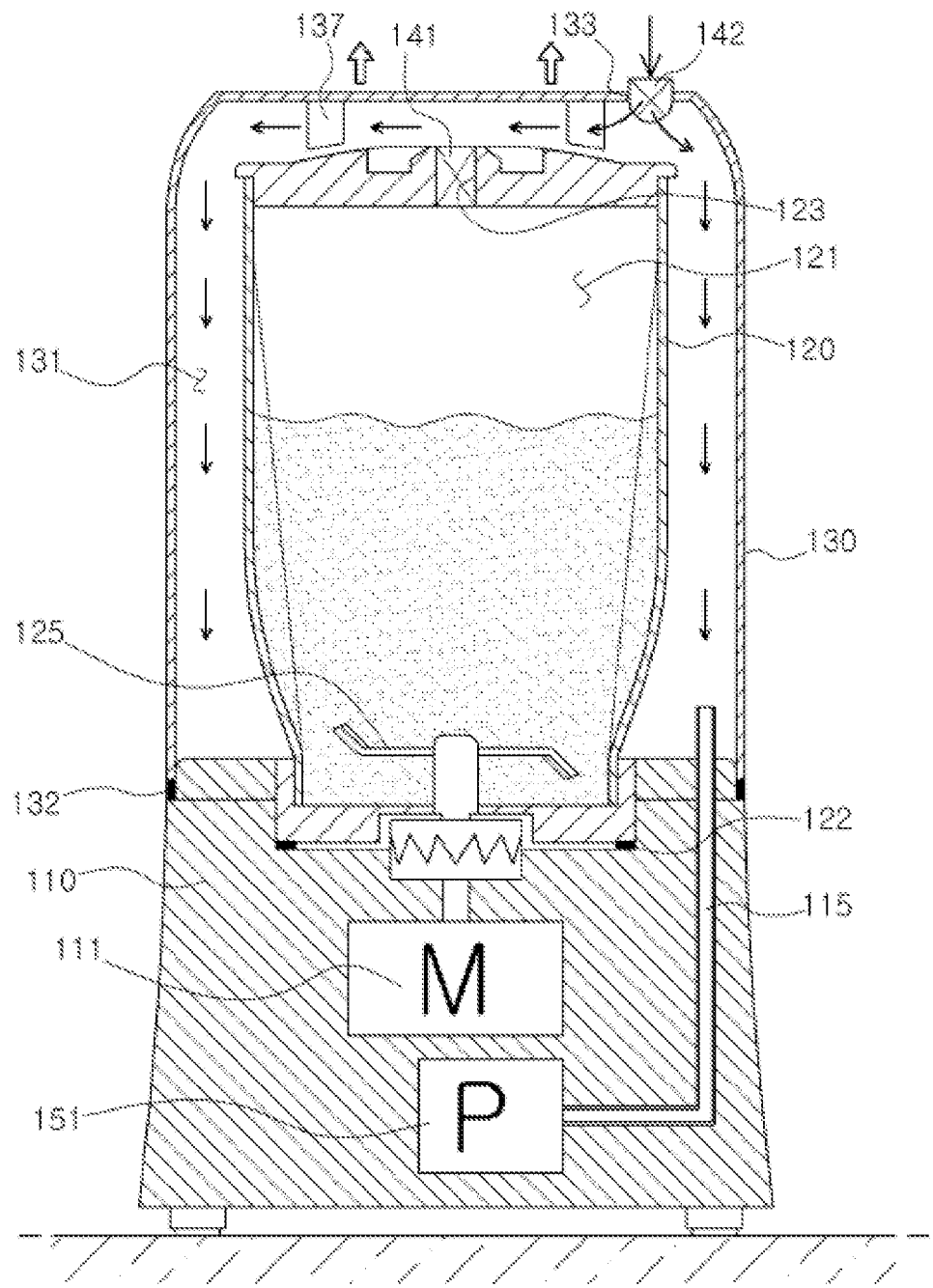
FIG. 7 is a view illustrating a side view of FIG. 6 in a state in which a vacuum state of a second chamber part is released.

FIG. 5 is a view illustrating a side structure of a vacuum blender according to a third embodiment of the present invention. FIG. 6 is a view illustrating a side structure of a vacuum blender in a state in which the interior of the vacuum blender is vacuumed according to a third embodiment of the present invention. FIG. 7 is a view illustrating a side view of FIG. 6 in a state in which a vacuum state of a second chamber part is released.

The vacuum blender of the present invention, as illustrated in FIG. 5, includes a driving body 110, an accommodation member 120, a cutter blade 125, a cover member 130, a first check valve 141, a second check valve 142, and a first vacuum pump 151.

A motor 111 is mounted on the interior of the driving body 110.

The accommodation member 120 is detachably coupled to an upper portion of the driving body 110, and has a first chamber part 121 that accommodates raw foods in the interior thereof.

A first discharge hole 123 that communicates the interior and the exterior of the accommodation member 120 is formed in the accommodation member 120.

It is preferable that the first discharge hole 123 is formed at an upper portion of the accommodation member 120.

The cutter blade 125 is rotatably disposed in the first chamber part 121, and is connected to the motor 111 to be rotated to blend the raw foods accommodated in the first chamber part 121.

The cover member 130 has various forms, and is detachably coupled to an upper portion of the driving body 110 while covering the entire outside of the accommodation member 120.

A second discharge hole 133 that communicates the interior and the exterior of the cover member 130 is formed in the cover member 130.

It is preferable that the second discharge hole 133 is formed at an upper portion of the cover member 130.

The first discharge hole 123 and the second discharge hole 133 may be formed at various locations as well as the upper portion of the cover member 130.

A second chamber part 131 is formed along an upper portion and the circumference of a side surface of the accommodation member 120 between the outside of the accommodation member 120 and the interior of the cover member 130.

That is, the first chamber part 121 is formed inside the accommodation member 120, and the second chamber part 131 is formed between the cover member 120 and the cover member 130.

A first elastic closing member 122 including silicon is disposed between a lower end of the accommodation member 120 and an upper surface of the driving body 110, and a second elastic closing member 132 including silicon is disposed between a lower end of the cover member 130 and an upper surface of the driving body 110.

The first elastic closing member 122 and the second elastic closing member 132 interrupt the communication of the second chamber part 131 and the outside when the cover member 130 covers the accommodation member 120, and is elastically deformed when an external force is applied to reduce noise due to the relative movement of the cover member 130 and the driving body 110 by absorbing the relative movement of the cover member 130 and the driving body 110.

The first check valve 141 is mounted in the first discharge hole 123, and selectively communicates the first chamber part 121 and the second chamber part 131 by opening and closing the first discharge hole 123.

The first check valve 141 interrupts the communication of the first chamber part 121 and the second chamber part 131 by closing the first discharge hole 123 in a free state in which an external force is not applied.

Further, if the first check valve 141 opens the first discharge hole 123 with an external force, the first chamber part 121 and the second chamber part 131 are communicated with each other through the first discharge hole 123.

The second check valve 142 is mounted in the second discharge hole 133, and selectively communicates the second chamber part 131 and the outside by opening and closing the second discharge hole 133.

The second check valve 142 interrupts the communication of the second chamber part 131 and the outside by closing the second discharge hole 133 in a free state in which an external force is not applied.

Further, if the second check valve 142 opens the second discharge hole 133 with an external force, the second chamber part 131 and the outside are communicated with each other through the second discharge hole 133.

Further, the first discharge hole 123 and the second discharge hole 133 are spaced apart from each other, the first check valve 141 and the second check valve 142 mounted therein also are spaced apart from each other, and the second chamber part 131 is formed between the first check valve 141 and the second check valve 142.

The shapes and structures of the first check valve 141 and the second check valve 142 may be sufficient by using a conventionally known structure, and a detailed description thereof will be omitted.

The first vacuum pump 151 is mounted on the driving body 110.

The first vacuum pump 151 is communicated with the second chamber part 131.

To achieve this, a suction hole 115 that connects the second chamber part 131 and the first vacuum pump 151 is formed in the driving body 110, and the suction hole 115 is formed at an upper portion of the driving body 110 between the accommodation member 120 and the cover member 130.

Accordingly, the suction hole 115 is communicated with the second chamber part 131, and when the first vacuum pump 151 is operated, the air in the interiors of the second chamber part 131 and the first chamber part 121 is discharged to the outside through the suction hole 115 such that the interiors of the second chamber part 131 and the first chamber part 121 are vacuumed.

In more detail, if the first vacuum pump 151 is operated, as illustrated in FIG. 6, the air in the interior of the second chamber part 131 communicated with the first vacuum pump 151 through the suction hole 115 is discharged to the outside through the first vacuum pump 151 such that the second chamber part 131 is vacuumed, and as the second chamber part 131 is vacuumed, the first check valve 141 mounted on the accommodation member 120 opens the first discharge hole 123 with the vacuum pressure.

If the first discharge hole 123 is opened, the air in the interior of the first chamber part 121 flows to the suction hole 115 and the first vacuum pump 151 through the first discharge hole 123 and the second chamber part 131 and is discharged to the outside.

Accordingly, the first chamber part 121 as well as the second chamber 131 is vacuumed, and the cover member 130 is lowered by the vacuum pressure when the second chamber part 131 is vacuumed to be adhered and coupled to the driving body 110.

Because the foods are blended in a vacuum state when the raw foods, such as vegetables or fruits, accommodated in the first chamber part 121 is blended in a vacuum state by vacuuming the first chamber part 121, browning and destruction of nutrients caused when the raw foods contact air can be prevented by vacuuming the first chamber part 121.

Further, by vacuuming the second chamber part 131 formed outside the accommodation member 120, noise generated when the raw foods accommodated in the first chamber part 21 and noise of the cutter blade 125 can be interrupted not only by the cover member 130 but also by the vacuumed second chamber part 131 such that the noise can be restrained from being emitted more effectively.

Further, according to the present invention, because the first discharge hole 123 formed in the accommodation member 120 and the suction hole 115 are spaced apart from each other while the second chamber part 131 is interposed therebetween, vapor or liquid that may be generated when the raw foods are blended may flow directly to the suction hole 115 and the first vacuum pump 151, preventing the first vacuum pump 151 from breaking down even though the vapor or liquid is discharged to the outside of the accommodation member 120 through the first discharge hole 123.

That is, according to the present invention, because the first discharge hole 123 and the suction hole 115 are not directly connected to each other and are spaced apart from each other through the second chamber part 131, and because the liquid or the like that is present in the first chamber part 121 is accumulated in the second chamber part 131 even though the liquid or the like is discharged to the outside through the first discharge hole 123, the liquid or the like directly flows to the suction hole 115 and the first vacuum pump 151, preventing the first vacuum pump 151 from being damaged.

In addition, because the first check valve 141 mounted in the first discharge hole 123 is coupled to an upper portion of the accommodation member 120, the user can easily wash the first check valve 141 after separating the first check valve 141.

According to the present invention, because the first chamber part 121 and the second chamber part 131 are divided by the first check valve 141, as illustrated in FIG. 7, the vacuum state of the second chamber part 131 is released through the introduction of the exterior air when the second discharge hole 133 is opened by the second check valve 142 in a state in which the first chamber part 121 and the second chamber part 131 are vacuumed, but the first chamber part 121 causes the first check valve 141 to close the first discharge hole 123 by the vacuum pressure of the first chamber part 121 such that the second chamber part 131 independently maintains the vacuum state.

Accordingly, after releasing the vacuum state of the second chamber part 131 and separating the cover member 130 from the driving body 110, the user may separate only the accommodation member 120, in which the blended raw foods are accommodated in the vacuum state, from the driving body 110 and preserve the separated accommodation member 120 in the refrigerator and the like.

In this way, according to the present invention, the raw foods can be blended in the vacuum state, and the entire volume of the blended raw foods for portability and preservation can be reduced by separating only the accommodation member 120, in which the blended raw foods are accommodated, and carrying them in the vacuum state or preserving them in the refrigerator or the like.

Further, the present invention may further include an impact absorbing member 137 that reduces vibration of the accommodation member 120 as one end thereof contacts an outer peripheral surface of the accommodation member 120 and an opposite end thereof contacts an inner peripheral surface of the cover member 130.

The impact absorbing member 137 includes elastic rubber, a cylinder, sponge, and a spring.

When the raw foods are blended by the impact absorbing member 137, the accommodation member 120 can be restrained from vibrating or shaking such that noise can be minimized.

In the drawings of the embodiment, the impact absorbing member 137 contacts the upper surface of the accommodation member 120 and the inner peripheral surface of an upper portion of the cover member 130 to be adhered thereto, and a plurality of impact absorbing members 137 may be disposed to be spaced apart from each other such that air may flow between the impact absorbing members 137.

Unlike the drawing of the embodiment, the impact absorbing member 137 includes a material, such as sponge, which becomes elastic while air passes through the material, to cause air to flow through the interior of the impact absorbing member 137, and then, the impact absorbing member 137 has a ring shape at an outskirt of the first discharge hole 123.

Further, although the impact absorbing member 137 is disposed to contact the inner peripheral surface of the cover member 130 and contact the accommodation member 120 in a free state, preferably, as illustrated in the drawing of the embodiment, the impact absorbing member 137 is coupled to the inner peripheral surface of the cover member 130 and is slightly separated from the accommodation member 120 in a free state in which an external force is not applied. That is, it is preferable that the impact absorbing member 137 is spaced apart from the outer peripheral surface of the accommodation member 120 in a state in which the second chamber part 131 is not vacuumed, and the impact absorbing member 137 is adhered to the outer peripheral surface of the accommodation member 120 while the cover member 130 is deflected or moved toward the accommodation member 120 by the vacuum pressure when the second chamber part 131 is vacuumed such that the shaking of the accommodation member 120 and the cover member 130 is reduced.

Hereinafter, an operation process of the present invention including the above-described configuration will be discussed.

The raw foods, such as fruits, are introduced into the first chamber part 121 formed in the interior of the accommodation member 120, and the accommodation member 120 is coupled to an upper portion of the driving body 110.

Then, a lower portion of the cutter blade 125 and the motor 111 are coupled to each other.

Further, the accommodation member 120 and the first discharge hole 123 are disposed at an upper portion of the accommodation member 120.

Thereafter, the cover member 130 is covered to be coupled to the driving body 110 such that the cover member 130 covers the outside of the accommodation member 120.

Accordingly, the second chamber part 131 is formed between the accommodation member 120 and the cover member 130.

Further, by the second elastic closing member 132 disposed between a lower portion of the cover member 130 and an upper portion of the driving body 110, the second chamber part 131 is sealed as the communication of the second chamber part 131 and the outside is further interrupted.

If electric power is applied in this state, first, as illustrated in FIG. 6, the first vacuum pump 151 is operated to discharge the air that is present in the second chamber part 131 and the first chamber part 121.

In more detail, the air that is present in the interior of the second chamber part 131 is discharged to the outside through the suction hole 115 and the first vacuum pump 151, and the first check valve 141 opens the first discharge hole 123 as the second chamber part 131 is vacuumed, and accordingly, the air that is present in the first chamber part 121 is discharged through the suction hole 115 and the first vacuum pump 151 such that the first chamber part 121 and the second chamber part 131 are all vacuumed.

If the operation of the first vacuum pump 151 is stopped as the vacuuming is completed, the first check valve 141 closes the first discharge hole 123 by the self-weight thereof.

In this way, if the first chamber part 121 and the second chamber part 131 are completely vacuumed, the raw foods that are present in the first chamber part 121 are blended by rotating the cutter blade 125 with the motor 111.

Because the raw foods are blended in a state in which the first chamber part 121 is vacuumed, the contact of the raw foods with the air is interrupted when the raw foods are blended, and thus the change of the color of the foods, the destruction of the nutrients, or the contamination of the foods can be prevented.

Further, as the cover member 130 that covers the accommodation member 120 and the second chamber part 131 are vacuumed, noise generated when the cutter blade 125 is rotated can be interrupted.

Further, as the second chamber part 131 is vacuumed, the cover member 130 is further adhered and coupled to the driving body 110, and the impact absorbing member 137 is attached to the outer peripheral surface of the accommodation member 120 to further prevent the accommodation member 120 and the cover member 130 from being relatively shaken, causing noise.

After the blending, when the accommodation member 120 is to be separated from the driving body 110 or the raw foods are to be taken, as illustrated in FIG. 7, the user opens the second discharge hole 133 by operating the second check valve 142.

If the second discharge hole 133 is opened, the exterior air is introduced into the second chamber part 131 through the second discharge hole 133.

In this way, although the vacuum state of the second chamber part 131 is released if the exterior air is introduced into the second chamber part 131, the first check valve 141 closes the first discharge hole 123 more strongly by the difference between the vacuum pressures of the first chamber part 121 and the second chamber part 131.

Accordingly, the vacuum state of the second chamber part 131 is released, but the first chamber part 121, in which the raw foods are accommodated, maintains the state in which the first chamber part 121 is vacuumed independently from the second chamber part 131.

After the vacuum state of the second chamber part 131 is released and the cover member 130 is separated, only the accommodation member 120 in the vacuum state may be separated from the driving body 110 and may be preserved in a refrigerator or the like in a vacuum state while occupying a small volume.

Further, when the raw foods accommodated in the accommodation member 120 are to be taken, the first discharge hole 123 is opened by operating the first check valve 141.

Then, the exterior air is introduced into the first chamber part 121 through the first discharge hole 123 such that the vacuum state of the first chamber part 121 is released, and accordingly, the blended raw foods accommodated in the accommodation member 120 can be taken in a fresh state by easily opening the cover of the accommodation member 120.

In this way, according to the present invention, the raw foods can be blended in the vacuum state, the noise generated during the blending operation can be reduced, and only the accommodation member 120, in which the raw foods are accommodated, can be separated to be carried or preserved in the vacuum state.

The present invention may be applied to an agricultural blender and a domestic blender (a first blender).

Fourth Embodiment

Figure 8:
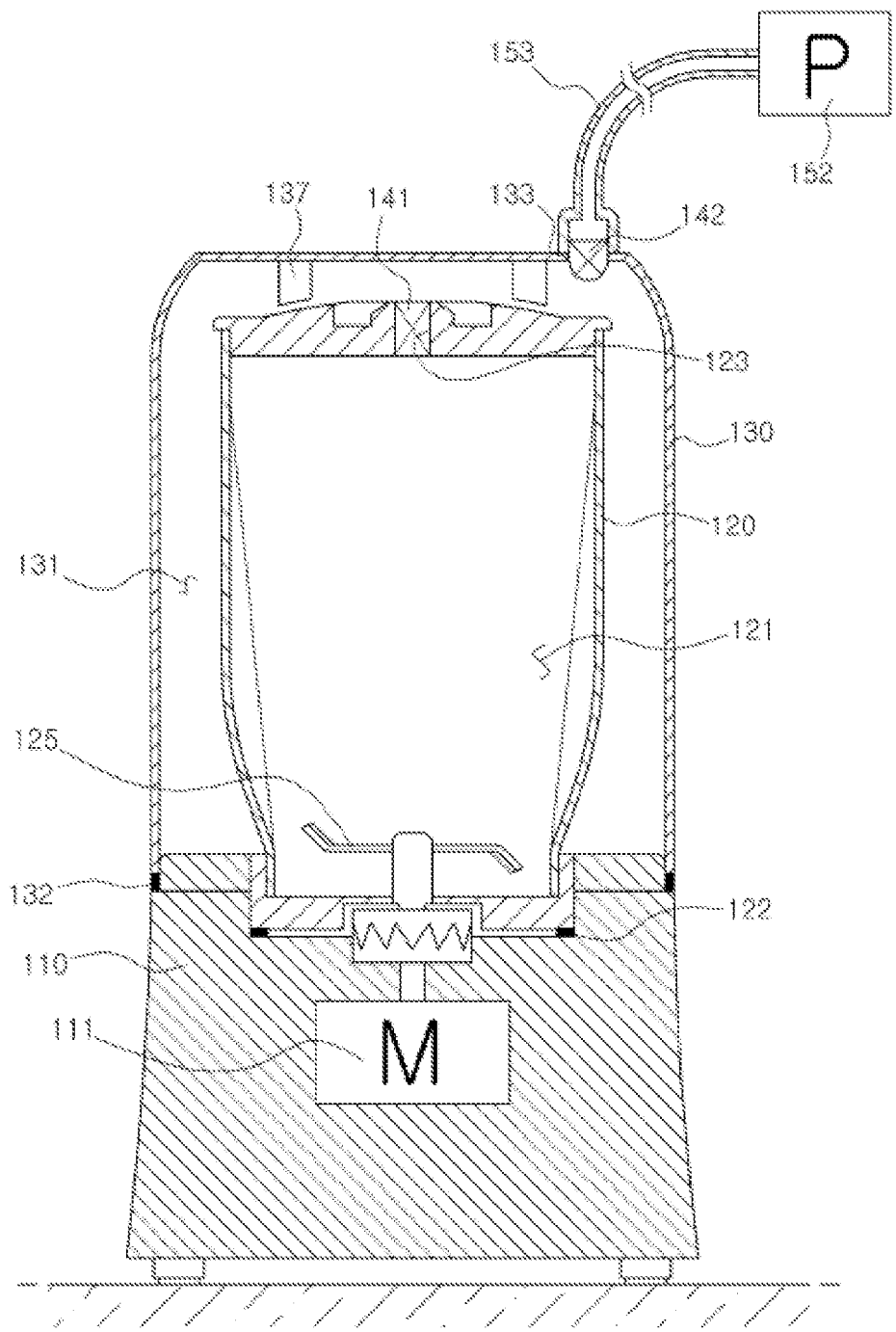
FIG. 8 is a view illustrating a side structure of a vacuum blender according to a fourth embodiment of the present invention.
Figure 9:
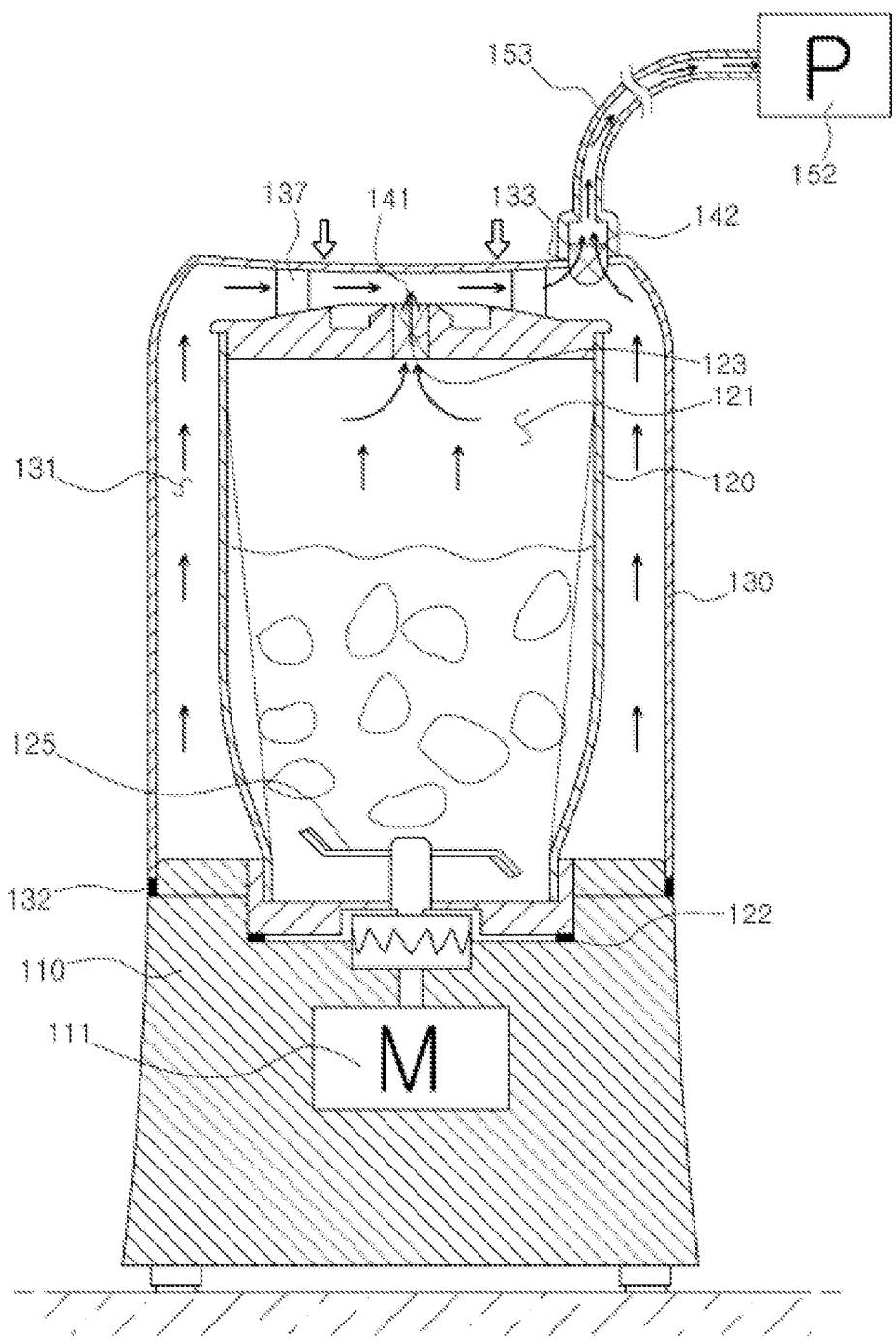
FIG. 9 is a view illustrating a side structure of a vacuum blender in a state in which the interior of the vacuum blender is vacuumed according to a fourth embodiment of the present invention.
Figure 10:
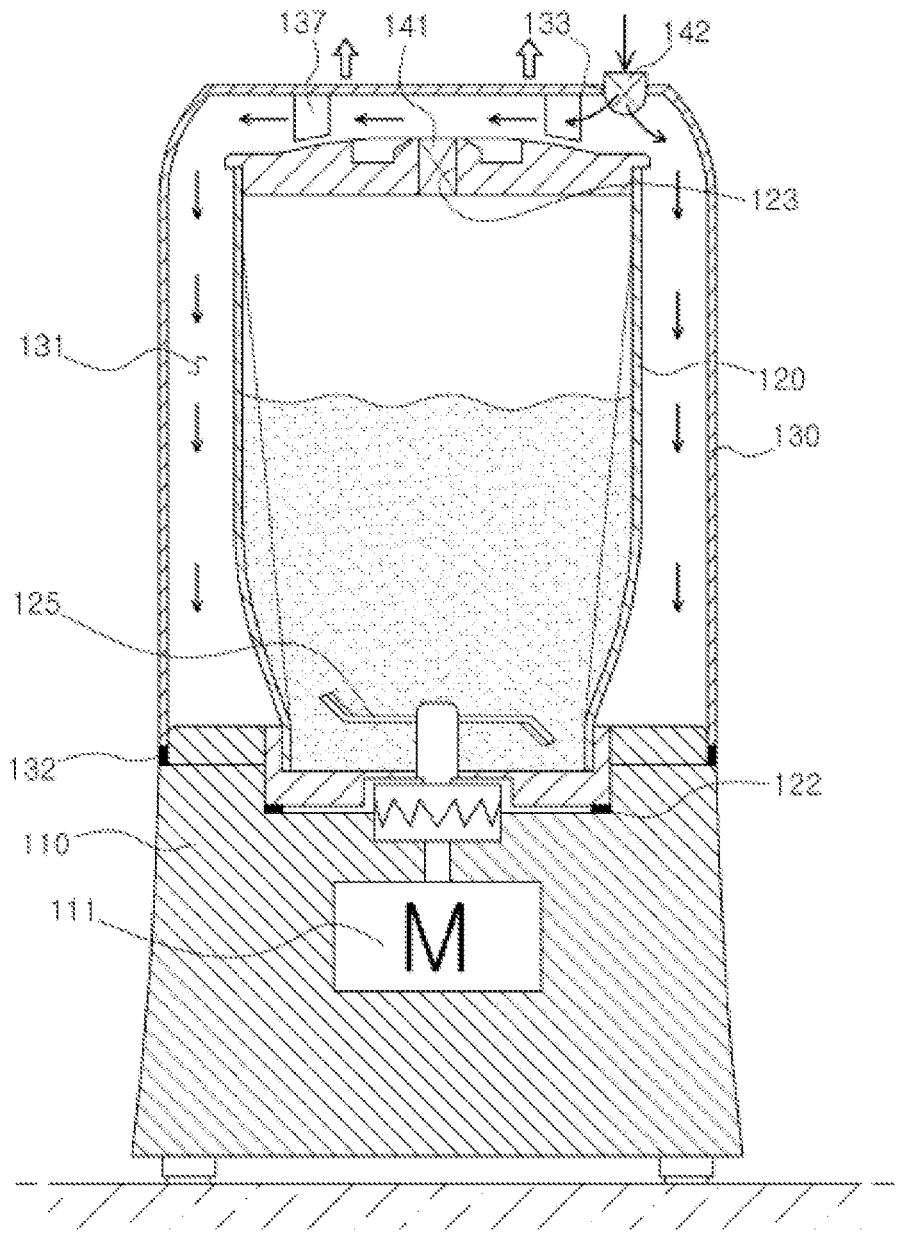
FIG. 10 is a view illustrating a side view of FIG. 9 in a state in which a vacuum state of a second chamber part is released.

FIG. 8 is a view illustrating a side structure of a vacuum blender according to a fourth embodiment of the present invention. FIG. 9 is a view illustrating a side structure of a vacuum blender in a state in which the interior of the vacuum blender is vacuumed according to a fourth embodiment of the present invention. FIG. 10 is a view illustrating a side view of FIG. 9 in a state in which a vacuum state of a second chamber part is released.

When compared with the third embodiment, the fourth embodiment is different from the third embodiment in that a first vacuum pump 151 mounted on the driving body 110 is not present and a second vacuum pump 152 disposed outside the driving body 110 is provided.

The second vacuum pump 152 is detachably coupled to an upper portion of the second check valve 142 by a suction hose 153.

The first discharge hole 123 and the second discharge hole 133 are spaced apart from each other by the second chamber part 131, and when the second vacuum pump 152 is operated, the second check valve 142 opens the second discharge hole 133 such that the air in the second chamber part 131 is discharged to the outside through the second discharge hole 133 and the second vacuum pump 152.

As the second chamber part 131 is vacuumed, the first check valve 141 opens the first discharge hole 123, and accordingly, the air in the interior of the first chamber part 121 is discharged to the outside via the first discharge hole 123, the second chamber part 131, the second discharge hole 133, the suction hose 153, and the second vacuum pump 152.

Through this, the first chamber part 121 and the second chamber part 131 is all vacuumed.

The process of releasing the vacuum state of the second chamber part 131 by operating the second check valve 142 after the blending operation, separating the accommodation member 120 from the driving body 110 to preserve the accommodation member 120 in the vacuum state, and releasing the vacuum state of the interior of the accommodation member 120 are the same as that of the third embodiment.

The other items are the same as or similar to the third embodiment, and a detailed description thereof will be omitted.

The vacuum blender of the present invention is not limited to the above-described embodiment, and may be variously modified in a range of the technical spirit of the present invention.

INDUSTRIAL APPLICABILITY

The present invention can be applied to a vacuum blender that blends foods in a vacuum state and this is industrially applicable.

What is claimed is:

1. A vacuum blender comprising:
   a driving body, in which a motor is mounted on an interior thereof;
   an accommodation member detachably coupled to an upper portion of the driving body and having a first chamber part configured to accommodate foods in an interior thereof;
   a cutter blade disposed in the first chamber part and connected to the motor to blend the foods accommodated in the first chamber part;
   a cover member detachably coupled to the driving body while covering an outside of the accommodation member;
   a second chamber part formed along a circumference of the accommodation part between the outside of the accommodation member and an interior of the cover member;
   a first check valve mounted on the accommodation member and configured to selectively communicate the first chamber part and the interior of the cover member;
   a vacuum pump mounted on the driving body and communicated with the first chamber part;
   a suction hole formed at an upper portion of the driving body between the accommodation member and the cover member and configured to communicate the second chamber part and the vacuum pump; and
   a communication valve mounted on the driving body and configured to open and close a passage between the second chamber part and the vacuum pump,
   wherein a state of the first check valve is maintained by closing the communication of the first chamber part and the second chamber part in a state in which an external force is not applied, and
   wherein when the vacuum pump is operated, the air in an interior of the second chamber part is discharged to an outside through the suction hole and the vacuum pump, the first check valve is opened by a vacuum pressure, and the second chamber part and the first chamber part are vacuumed while the air in an interior of the first chamber part is discharged to the outside through the suction hole and the vacuum pump via the first check valve and the second chamber part,
   wherein if the second chamber part and the first chamber part are vacuumed to a preset state, the communication valve closes the passage between the vacuum pump and the second chamber part,
   wherein if exterior air is introduced into the second chamber part by opening the communication valve that closes the passage between the second chamber part and the vacuum pump, vacuum of the second chamber part is released, and the first check valve closes the communication of the first chamber part and the second chamber part by the vacuum pressure of the first chamber part to maintain a vacuum state of the first chamber part as the exterior air is introduced into the second chamber part.

2. A vacuum blender comprising:
   a driving body, in which a motor is mounted on an interior thereof;
   an accommodation member detachably coupled to an upper portion of the driving body and having a first chamber part configured to accommodate foods in an interior thereof;
   a cutter blade disposed in the first chamber part and connected to the motor to blend the foods accommodated in the first chamber part;
   a cover member detachably coupled to the driving body while covering an outside of the accommodation member; and
   a first check valve mounted on the accommodation member and configured to be opened only when air is discharged from the first chamber part to an outside by selectively communicating the first chamber part and an interior of the cover member;
   a second chamber part formed along a circumference of the accommodation part between the outside of the accommodation member and the interior of the cover member; and
   a second check valve mounted on the cover member and configured to be opened only when air is discharged from the second chamber part to the outside by selectively communicating the outside of the second chamber part,
   wherein when a vacuum pump is operated in a state in which a suction hose of the vacuum pump disposed on the outside is coupled to the second check valve, the air in an interior of the second chamber part is discharged to the outside through the second check valve and the vacuum pump, the first check valve is opened by a vacuum pressure, and the air in an interior of the first chamber part is discharged to the outside through the vacuum pump via the first check valve, the second chamber part, and the second check valve, and
   as exterior air is introduced into the second chamber part, the first check valve is closed and the first chamber part maintains a vacuum state while the vacuum state is not released, and
   the vacuum state of the interior of the first chamber part is released through the first check valve.

3. The vacuum blender of claim 1, further comprising:
   an impact absorbing member configured to reduce vibration of the accommodation member as one end thereof contacts an outer peripheral surface of the accommodation member and an opposite end thereof contacts an inner peripheral surface of the cover member.

4. The vacuum blender of claim 3, wherein the impact absorbing member is coupled to an inner peripheral surface of the cover member, and
   wherein when the second chamber part is vacuumed, the impact absorbing member is adhered to an outer peripheral surface of the accommodation member while the cover member is deflected toward the accommodation member by a vacuum pressure.

5. The vacuum blender of claim 1, wherein a vacuum channel communicated with the second chamber part is formed on a side wall of the driving body, and
   wherein when the vacuum pump is operated, the vacuum channel is vacuumed.

6. The vacuum blender of claim 5, wherein the vacuum channel is formed along a circumference of the motor, and
   wherein a lower end of the vacuum channel extends to a lower portion of the motor or extends downwards further than the lower portion of the motor.

7. The vacuum blender of claim 1, further comprising:
   a pressure sensor mounted on the driving body to measure the pressure of the air flowing through the suction hole,
   wherein if a pressure value measured by the pressure sensor is a preset value or more, the communication valve closes the passage between the vacuum pump and the second chamber part.

8. The vacuum blender of claim 1, wherein the cover member is adhered and coupled to the driving body by a vacuum pressure when the second chamber part is vacuumed.

9. A vacuum blender comprising:
a driving body, in which a motor is mounted on an interior thereof having a first chamber part configured to accommodate raw foods in an interior thereof;
an accommodation member detachably coupled to an upper portion of the driving body and having the first chamber part configured to accommodate the raw foods in the interior thereof;
a cutter blade disposed in the first chamber part and connected to the motor to blend the raw foods accommodated in the first chamber part;
a cover member detachably coupled to an upper portion of the driving body while covering an entire outside of the accommodation member and defining a second chamber part along an upper portion and a circumference of a side surface of the accommodation member between the cover member and the outside of the accommodation member;
a first check valve mounted in a first discharge hole formed in the accommodation member and configured to selectively communicate the first chamber part and the second chamber part by opening and closing the first discharge hole; and
a second check valve mounted in a second discharge hole formed in the cover member and configured to selectively communicate the second chamber part and an outside by opening and closing the second discharge hole,
an impact absorbing member, one end of which contacts an outer peripheral surface of the accommodation member and an opposite end of which contacts an inner peripheral surface of the cover member such that vibration of the accommodation member is reduced,
wherein the accommodation member is disposed inside the second chamber part while being spaced apart from the cover member,
wherein the first check valve opens the first discharge hole by an external force to communicate the first chamber part and the second chamber part,
wherein the second check valve interrupts the communication of the second chamber part and the outside by closing the second discharge hole in a free state, and communicates the second chamber part and the outside by opening the second discharge hole by an external force,
wherein the first chamber part is vacuumed as the first check valve opens the first discharge hole by a vacuum pressure while the second chamber part is vacuumed by an operation of the vacuum pump communicated with the second chamber part,
wherein when the second discharge hole is opened by the second check valve in a state in which the first chamber part and the second chamber part are vacuumed, a vacuum state of the second chamber part is released as exterior air is introduced, and the first check valve closes the first discharge hole by a vacuum pressure of the first chamber part such that the first chamber part maintains a state in which the first chamber part is vacuumed independently from the second chamber,
wherein the absorbing member is coupled to an inner peripheral surface of the cover member,
wherein the absorbing member is spaced apart from an outer peripheral surface of the accommodation member in a state in which the second chamber part is not vacuumed, and
wherein when the second chamber part is vacuumed, the impact absorbing member is adhered to an outer peripheral surface of the accommodation member while the cover member is moved toward the accommodation member by a vacuum pressure.

10. The vacuum blender of claim 9, further comprising:
a first vacuum pump mounted on the driving body,
wherein the first vacuum pump is communicated with the second chamber part through a suction hole formed in the driving body,
wherein the first discharge hole and the suction hole are spaced apart from each other by the second chamber part, and
wherein when the first vacuum pump is operated, the air in the second chamber part is discharged to the outside through the first vacuum pump.

11. The vacuum blender of claim 9, further comprising:
a second vacuum pump mounted on an outside of the driving body,
wherein the second vacuum pump is coupled to an upper portion of the second check valve by a suction hose,
wherein the first discharge hole and the second discharge hole are spaced apart from each other by the second chamber part, and
wherein when the second vacuum pump is operated, the second check valve opens the second discharge hole and the air in the second chamber part is discharged to the outside through the second discharge hole and the second vacuum pump.

12. The vacuum blender of claim 9, wherein the first check valve and the second check valve are spaced apart from each other, and the second chamber part is formed between the first check valve and the second check valve.

13. The vacuum blender of claim 9, wherein a first elastic closing member is disposed between the accommodation member and the driving body,
wherein a second elastic closing member is disposed between a lower end of the cover member and an upper surface of the driving body, and
wherein the first elastic closing member and the second elastic closing member interrupt the communication of the second chamber part and the outside, and are elastically deformed when an external force is applied to absorb a relative movement of the cover member and the driving body.

14. The vacuum blender of claim 9, wherein the impact absorbing member comprises a material that becomes elastic while air passes through an interior of the impact absorbing member.

15. The vacuum blender of claim 9, wherein the first check valve interrupts the communication of the first chamber part and the second chamber part by closing the first discharge hole in a free state, and communicates the first chamber part and the second chamber part by opening the first discharge hole by an external force.

16. The vacuum blender of claim 2, further comprising:
an impact absorbing member configured to reduce vibration of the accommodation member as one end thereof contacts an outer peripheral surface of the accommodation member and an opposite end thereof contacts an inner peripheral surface of the cover member.

17. The vacuum blender of claim 2, wherein the cover member is adhered and coupled to the driving body by a vacuum pressure when the second chamber part is vacuumed.

\* \* \* \* \*